United States Patent [19]

Kitamura et al.

[11] 3,859,379

[45] Jan. 7, 1975

[54] EPOXY COMPOSITION CONTAINING PHENOLIC NOVOLACS TETRA SUBSTITUTED BORATE ANIONS AND A PHOSPHONIUM, ARSONIUM, QUATERNARY AMMONIUM CATION, OR TETRA SUBSTITUTED BORATES OF IMIDAZOLE

[75] Inventors: Masahiro Kitamura; Hiroshi Suzuki; Mikio Sato, all of Hitachi, Japan

[73] Assignees: Hitachi, Ltd.; Hitachi Chemical Company, Ltd., both of Tokyo, Japan

[22] Filed: Mar. 18, 1974

[21] Appl. No.: 452,137

[30] Foreign Application Priority Data

Mar. 19, 1973  Japan.............................. 48-31027

[52] U.S. Cl. .............. 260/831, 260/2 EC, 260/2 N, 260/19, 260/42, 260/42.26, 260/42.28, 260/47 EC, 260/47 EN, 260/824 EP, 260/830 R, 260/830 S, 260/830 P
[51] Int. Cl............................................ C08g 45/08
[58] Field of Search........................ 260/831, 47 EC

[56] References Cited
UNITED STATES PATENTS

| | | | |
|---|---|---|---|
| 2,970,130 | 1/1961 | Finestone............................ | 260/831 |
| 3,048,552 | 8/1962 | Fang.................................... | 260/831 |
| 3,336,415 | 8/1967 | Kennedy.............................. | 260/831 |
| 3,380,963 | 4/1968 | Thomas............................... | 260/831 |
| 3,551,519 | 12/1970 | Dubsky................................ | 260/831 |
| 3,626,022 | 12/1971 | Suzuki................................. | 260/831 |
| 3,642,698 | 2/1972 | Green................................. | 260/831 |
| 3,655,816 | 4/1972 | Lorenz................................ | 260/831 |

*Primary Examiner*—Paul Lieberman
*Attorney, Agent, or Firm*—Craig & Antonelli

[57] ABSTRACT

This invention provides an epoxy resin composition excellent in curability and storage stability (shelf life or potting life), and capable of yielding a cured product of excellent characteristics, comprising an epoxy resin incorporated with a phenol novolac resin as curing agent and an organoboron compound as curing promoter.

8 Claims, 1 Drawing Figure

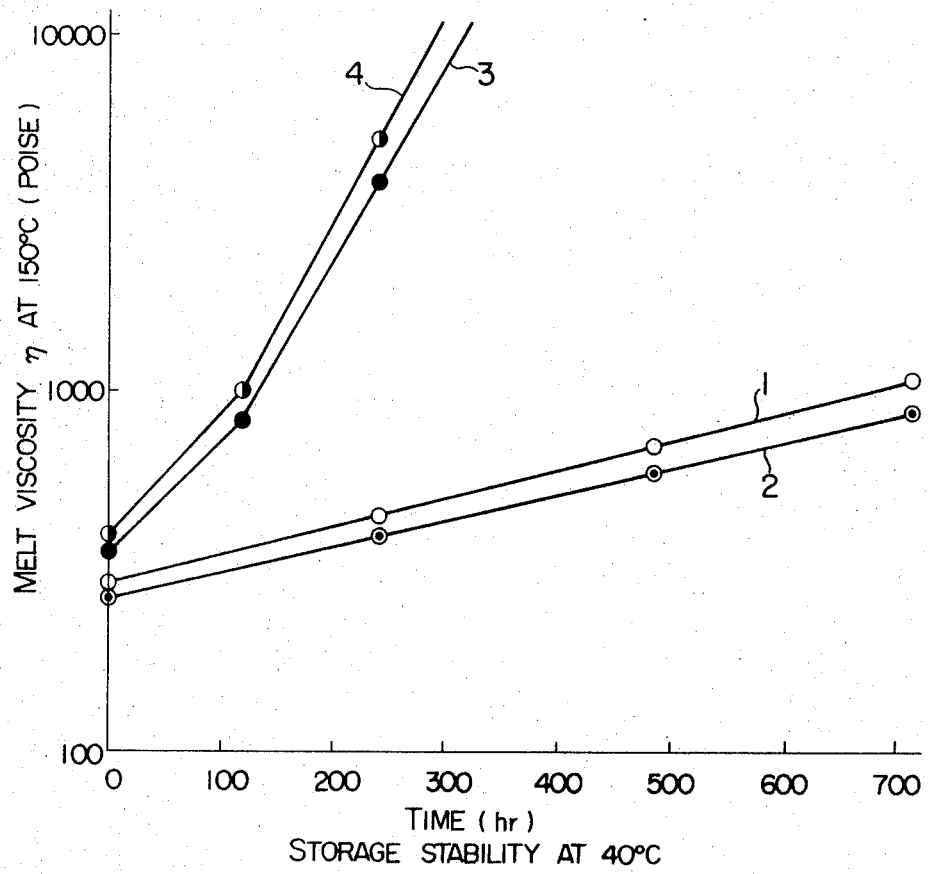
STORAGE STABILITY AT 40°C

EPOXY COMPOSITION CONTAINING PHENOLIC NOVOLACS TETRA SUBSTITUTED BORATE ANIONS AND A PHOSPHONIUM, ARSONIUM, QUATERNARY AMMONIUM CATION, OR TETRA SUBSTITUTED BORATES OF IMIDAZOLE

Epoxy resins are preferred for such rather diversified uses as casting, molding, laminating, adhering, impregnating, and coating. The methods for curing epoxy resins can be broadly classified into the following three: the first is a method using chiefly an acid anhydride curing agent, the second a method using an amine-type curing agent, and the third is a method using such a curing agent as a boron fluoride-amine complex and an imidazole. These methods, however, have the following disadvantages: In the first method which utilizes an acid anhydride curing agent, a rather high temperature and a long heating period of time are necessary in curing, and hence tertiary amines or quaternary ammonium salts are added as curing promoter in order to shorten the curing time. The addition of such a promoter has a disadvantage of bringing about a marked decrease in storage stability of the resulting epoxy resin composition. On the other hand, the second method which utilizes an amine-type curing agent has an advantage of producing a cured product superior generally in water resistance, chemical resistance, electrical properties, and mechanical properties to that obtained with an acid anhydride curing agent, but it is disadvantageous in that owing to a high reactivity of amines with epoxy resins, it is generally quite difficult to obtain a composition having a desirable storage stability. When an amine having a moderate reactivity is used, it is customary to use, in addition, a curing promoter such as, for example, a modified amine, a boron fluroide-amine complex, phenol, chlorophenol, bisphenol-A, resorcinol, phenolic resin, salicylic acid, a metal salt of salicylic acid, and triphenyl phosphite. However, the addition of such a curing promoter results, as mentioned above, in a marked shortening of the working life of the resin composition, in an insufficient curing promoting effect, or in deterioration in water resistance, chemical resistance, electrical properties, or mechanical properties. In short, among conventional acid anhydrides and amines, there are no compounds capable of satisfying all of the requirements for curability, and for characteristic properties of the cured product. When a certain boron fluoride-amine complex is used as the curing agent, it has already been known that an epoxy resin composition having a favorable storage stability is obtained, whereas the moisture resistance is yet to be improved.

An object of this invention is to provide an epoxy resin composition excellent in so-called latent curability, which has a favorable storage stability without gel formation at room temperature or thereabout and rapidly cures on heating.

Another object of this invention is to provide an epoxy resin composition which gives on curing a cured product excellent in characteristic properties including electrical and mechanical properties, and particularly in electrical insulating properties at high temperatures.

A further object of this invention is to provide a useful molding epoxy resin composition capable of giving an article having a linear thermal expansion coefficient as low as $2.5 \times 10^{-5}/°C$ or lower and having an excellent moldability.

A still further object of this invention is to provide an epoxy resin composition useful as electrical insulating materials, particularly for encapsulating semiconductor devices.

Other objects and advantages of this invention will become apparent from the following description.

The epoxy resin composition of this invention is characterized by consisting essentially of (a) 100 parts by weight of an epoxy resin having at least two vicinal epoxy groups per molecule, (b) 30 to 200 parts by weight of a curing agent consisting of a phenol novolac resin having at least two hydroxyl groups per molecule, and (c) 0.1 to 20 parts by weight of a curing promoter consisting of at least one organoboron compound selected from the group consisting of tetra-substituted phosphonium-tetra-substituted borates represented by the general formula (I):

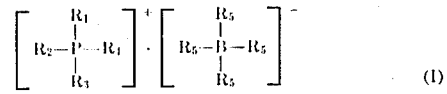

(I)

wherein $R_1$, $R_2$, $R_3$, and $R_4$ are independently alkyl groups, alkenyl groups, or aryl groups and $R_5$ is a phenyl group or a substituted phenyl group; tetra-substituted arsonium-tetra-substituted borates represented by the general formula (II):

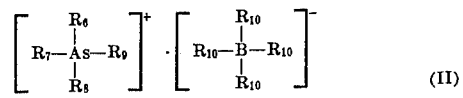

(II)

wherein $R_6$, $R_7$, $R_8$, and $R_9$ are independently alkyl groups, alkenyl groups, or aryl groups $R_{10}$ is a phenyl group or a substituted phenyl group; tetra-substituted ammonium-tetra-substituted borates represented by the general formula (III):

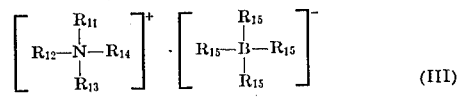

(III)

$R_{11}$, $R_{12}$, $R_{13}$, and $R_{14}$ are independently hydrogen atoms, alkyl groups, hydroxyl groups, phenyl groups, or substituted phenyl groups, and $R_{15}$ is a phenyl group or a substituted phenyl group; and tetra-substituted borates of imidazole and tetra-substituted borates of imidazole derivatives formed by reacting an alkali salt of tetra-substituted boron with an imidazole salt and an imidazole derivative salt obtained by reacting, with an acid, imidazole and an imidazole derivative represented by the general formula (IV):

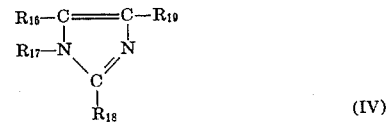

(IV)

wherein $R_{16}$, $R_{17}$, $R_{18}$, and $R_{19}$, which may be the same as or different from one another, are independently selected from the group consisting of hyrogen atom, alkyl groups, alkenyl groups, acyl groups, aryl groups, cycloalkyl groups, cycloalkenyl groups, aldehyde group, carboxyl group, cyano group, and nitro group.

The most characteristic feature of this invention consists in the joint use of the above-said curing agent (b) and the curing promoter (c) consisting of a novel organoboron compound to cure the epoxy resin.

The curing agent of the phenol novolac resin type having at least two hydroxyl groups per molecule for use in this invention is a substance in which molecules of a phenolic compound represented by the general formula (V):

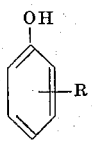

(V)

wherein R is a hydrogen atom or an alkyl group, are bonded through methylene linkages to one another obtained by subjecting the phenolic compound to dehydration-condensation with an aldehyde compound such as formaldehyde in the presence of an inorganic acid such as hydrochloric acid or sulfuric acid or an organic acid such as oxalic acid, succinic acid, or acetic acid. A phenol novolac resin obtained by other ways may also be used so long as the resin has at least two hydroxyl groups per molecule. The molecular weight of the phenol novolac resin is preferably 200 or higher, because the resin having a molecular weight below 200 is poor in reactivity with the epoxy resin. The suitable amount of the curing agent to be incorporated is in the range of from 30 to 200 parts by weight per 100 parts by weight of the epoxy resin. If the amount is below 30 parts by weight, the curability of the resin composition is markedly inferior, the electrical and mechanical properties of the cured product are also deteriorated, and particularly the semiconductor characteristics are most adversely affected. On the other hand, if the amoung is above 200 parts by weight, the resulting composition becomes highly viscous, resulting in an extremely inferior fluidity. The range of from 40 to 100 parts by weight is particularly preferable. When the amount of curing agent is in said range, the resin composition is satisfactory in moldability, curability, storage stability, and in electrical and mechanical properties of the cured product, particularly in the effect on semiconductor characteristics.

Examples of the phenol novolac resin-type curing agents for use in this invention are phenol novolac resin, o-cresol novolac resin, m-cresol novolac resin, p-cresol novolac resin, 2,3-xylenol novolac resin, 2,4-xylenol novolac resin, 2,5-xylenol novolac resin, 2,6-xylenol novolac resin, 3,4-xylenol novolac resin, 3,5-xylenol novolac resin, o-ethylcresol novolac resin, m-ethylcresol novolac resin, p-ethylcresol novolac resin, p-phenylphenol novolac resin, p-tert-butylphenol novolac resin, and p-tert-amylphenol novolac resin. These resins may be used alone or in admixture of two or more.

The curing promoters for use in this invention can be prepared by the following methods.

The tetra-substituted phosphonium-tetra-substituted borates represented by the general formula (I) are obtained by reacting tetra-substituted phosphonium compounds such as tetrabutylphosphonium chloride, n-butyltriphenylphosphonium chloride, tetraphenylphosphonium chloride, trimethylphenylphosphonium chloride, and diethylmethylphenylphosphonium chloride, with alkali metal salts of tetra-substituted boron represented by the general formula (VI):

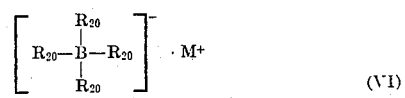

(VI)

wherein $R_{20}$ is a phenyl group or a substituted phenyl group, and M is an alkali metal such as lithium, sodium, or potassium, in water or an organic solvent such as an alcohol at room temperature or elevated temperatures. Examples of the compounds are tetrabutylphosphonium-tertraphenylborate, n-butyltriphenylphosphonium-tetraphenylborate, tetraphenylphosphonium-tetraphenylborate, trimethylphenylphosphonium-tetraphenylborate, diethylmethylphenylphosphonium-tetraphenylborate, diallylmethylphenylphosphonium-tetraphenylborate, (2-hydroxyethyl)triphenylphosphonium-tetraphenylborate, ethyltriphenylphosphonium-tetraphenylborate, p-xylenebis(triphenylphosphonium-tetraphenylborate), tetraphenylphosphonium-tetraethylborate, tetraphenylphosphonium-triethylphenylborate, and tetraphenylphosphonium-tetrabutylborate. These compounds may be used alone or in admixture of two or more. An example of the preparation is given below.

PREPARATION EXAMPLE 1

In 300 ml of distilled water heated at 50°C was dissolved 15.7 g (0.04 mole) of tetraphenylphosphonium chloride. To the resulting solution was slowly added with stirring 200 ml of an aqueous solution of 14.5 g(0.042 mole) of tetraphenylboron salt (Dotite Kalibor, produced by Dojin Yakukagaku Kenkyusho, Japan) to allow them to react to obtain 25 g of the objective tetraphosphonium-tetraphenylborate (as white precipitate), which had a melting point of 309°-311°C.

The tetra-substituted arsonium-tetra-substituted borates represented by the general formula (II) are obtained by reacting tetra-substituted arsonium compounds such as tetramethyl arsonium chloride, tetraphenylarsonium chloride, dimethyldiethylarsonium chloride, and triethyl-n-octylarsonium chloride, with alkali metal salts of tetra-substituted boron represented by the aforementioned general formula (VI) in water or an organic solvent such as an alcohol at room temperature or elevated temperatures. Examples of the compounds are tetramethylarsonium-tetraphenylborate, tetraphenylarsonium-tetraphenylborate, dimethyldiethylarsonium-tetraphenylborate, and triethyl-n-octylarsonium-tetraphenylborate. These compounds may be used alone or in admixture of two or more. An example of preparation is given below.

PREPARATION EXAMPLE 2

In 300 ml of distilled water at 50° as dissolved 5.0 g(0.012 mole) of tetraphenylarsonium chloride. To the resulting solution was added gradually with stirring 200 ml of an aqueous solution of 4.1 g (0.012 mole) of the same tetraphenylboron salt as used in Preparation Example 1 to allow them to react to obtain 8.0 g of the objective tetraphenylarsoniumtetraphenylborate (as white precipitate) having a melting point of 293°-294° C.

The tetra-substituted ammonium-tetra-substituted barates are obtained by reacting amines such as triethylamine, trimethylamine, triphenylamine, diethylmethylamine, and diphenylmethylamine with alkali metal salts or tetra-substituted boron represented by the aforementioned general formula (VI) in water or an organic solvent such as an alcohol, in the presence of an inorganic acid such as hydrochloric acid, sulfuric acid, or nitric acid or an organic acid such as acetic acid, oxalic acid, or succinic acid, at room temperature or elevated temperatures. Examples of the compounds are triethylammonium-tetraphenylborate, trimethylammonium-tetraphenylborate, triphenylammonium-tetraphenylborate, diethylmethylammonium-tetraphenylborate, and diphenylmethylammonium-tetraphenylborate. These compounds may be used alone or in admixture of two or more. An example of preparation is given below.

PREPARATION EXAMPLE 3

In 1.4 liters of distilled water were dissolved 15 g (0.149 mole) of triethylamine and 13 ml of concentrated hydrochloric acid. To the resulting solution was added gradually with stirring 400 ml of an aqueous solution of 50 g (0.146 mole) of the same tetraphenylboron salt as used in Preparation Example 1 to allow them to react to obtain 60.5 g of the objective triethylammonium-tetraphenylborate (as white precipitate) having a melting point of 195°–200° C.

The tetra-substituted borates of imidazole and its derivatives (hereinafter referred to as tetra-substituted borates of imidazoles) are obtained from the compounds of the general formula (IV) and alkali metal salts of tetra-substituted boron compounds as the starting materials. Examples of imidazole and its derivatives represented by the general formula (IV) include imidazole, 2-methylimidazole, 2-undecylimidazole, 2-heptadecylimidazole, 2-phenylimidazole, 2-ethyl-4-methylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, and 1-cyanoethyl-2-phenylimidazole. These imidazoles are reacted with at least one compound selected from the group consisting of inorganic acids such as hydrochloric acid, sulfuric acid, and nitric acid; organic acids such as acetic acid, oxalic acid, and succinic acid; acidic aromatic nitro compounds such as picric acid and picrolonic acid; and alkyl halides, in water or in an organic solvent such as an alcohol, at room temperature or at elevated temperatures, to form salts of imidazoles represented by the general formula (VII):

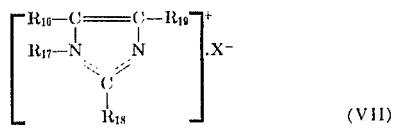

(VII)

wherein $R_{16}$, $R_{17}$, $R_{18}$ and $R_{19}$ are the same as those defined above; $R_{21}$ is a hydrogen atom, an alkyl group, an alkenyl group, an acyl group, an aryl group, a cycloalkyl group, a cycloalkenyl group, an aldehyde group, a carboxyl group, a cyano group, or a nitro group; and X is an anion such as chloride ion, bromide ion, iodide ion, sulfate ion, nitrate ion, or acetate ion. The salts of imidazoles thus formed are reacted with the alkali metal salts or tetra-substituted boron compounds represented by the aforementioned general formula (VI), in water or in an organic solvent such as an alcohol, at room temperature or at elevated temperatures, to obtain tetra-substituted borates of imidazoles represented by the formula (VIII):

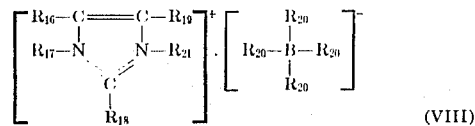

(VIII)

wherein $R_{16}$, $R_{17}$, $R_{18}$, $R_{19}$, $R_{20}$, and $R_{21}$ are the same as defined above. The general formulas (VII) and (VIII) are not yet established but presumed. Examples of the tetra-substituted borates of imidazoles are imidazolium-tetraphenylborate, methylimidazolium-tetraphenylborate, 2-ethyl-4-methylimidazolium-tetraphenylborate, 2-ethyl-1,4-dimethylimidazolium-tetraphenylborate, 1-cyanoethyl-2-ethyl-4-methylimidazolium-tetraphenylborate, 1-cyanoethyl-2-undecylimidazolium-tetraphenylborate, 1-cyanoethyl-2-phenylmidazolium-tetraphenylborate, 1-vinyl-2-methylimidazolium-tetraphenylborate, 1-vinyl-2,4-dimethylimidazolium-tetraphenylborate, 1-β-hydroxyethyl-2-methylimidazolium-tetraphenylborate, 1-allyl-2-methylimidazolium-tetraphenylborate, 1-allyl-2-phenylimidazolium-tetraphenylborate, and 1-allyl-2-undecylimidazolium-tetraphenylborate. These compounds may be used alone or in admixture of two or more. Examples of preparation of the tetra-substituted borates of imidazoles are given below. However, this invention is not limited to these examples, because any change in reaction conditions and any modification of the procedure may be easily made.

PREPARATION EXAMPLE 4

In 300 ml of water was dissolved 0.85 g of imidazole. After addition of 1.2 ml of concentrated hydrochloric acid to the resulting solution, reaction was allowed to proceed to form the compound of the formula (VII). To the reaction mixture was added with stirring 50 ml of an aqueous solution of 4.3 g of sodium salt of tetraphenylboron to allow them to react to obtain 4.5 g of the objective imidazolium-tetraphenylborate (as white precipitate) having a melting point of 185°–188° C.

PREPARATION EXAMPLE 5

In 300 ml of water was dissolved 1.6 g of 2-ethyl-4-methylimidazole. To the resulting solution was added 1.2 ml of concentrated hydrochloric acid to allow them to react to form the compound of the formula (VII). To the reaction mexture was added with stirring 50 ml of an aqueous solution of 4.3 g of sodium salt of tetraphenylboron to allow them to react to obtain 5.5 g of the objective 2-ethyl-4-methylimidazolium-tetraphenylborate (as white precipitate) having a melting point of 186°–190° C.

PREPARATION EXAMPLE 6

In 300 ml of methyl alcohol was dissolved 2.6 of 1-cyanoethyl-2-phenylimidazole. To the resulting solution was added 1.2 ml of concentrated hydrochloric acid to allow them to react to form the compound of the formula (VII). To the reaction mixture was added with stirring 50 ml of an aqueous solution of 4.3 g of sodium salt of tetraphenylboron to allow them to react to obtain 6.0 g of the objective 1-cyanoethyl-2-phenylimidazolium-tetraphenylborate (as white precipitate) having a melting point of 105°–110° C.

PREPARATION EXAMPLE 7

In 300 ml of methyl alcohol was dissolved 2.4 g of 1-cyanoethyl-2-undecylimidazole. To the resulting solution was added 0.8 ml of concentrated hydrochloric acid to allow them to react to form the compound of the formula (VII). To the reaction mixture was added with stirring 50 ml of an aqueous solution of 2.9 g of sodium salt of tetraphenylboron to allow them to react to obtain 5.0 g of the objective 1-cyanoethyl-2-undecylimidazolium-tetraphenylborate (as white precipitate) having a melting point of 95°–98° C.

PREPARATION EXAMPLE 8

In 300 ml of methyl alcohol was dissolved 2.2 g of 1-cyanoethyl-2-ethyl-4-methylimidazole. To the resulting solution was added 1.2 ml of concentrated hydrochloric acid to allow them to react to form the compound of the formula (VII). To the reaction mixture was added with stirring 50 ml of an aqueous solution of 4.3 g sodium salt of tetraphenylboron to allow them to react to obtain 6.0 g of the objective 1-cyanoethyl-2-ethyl-4-methylimidazolium-tetraphenylborate (as white precipitate) having a melting point of 160°–162° C.

PREPARATION EXAMPLE 9

In 100 ml of methyl alcohol was dissolved 1.2 g of 2-ethyl-4-methylimidazole. To the resulting solution was added 1.5 g of methyl iodine and refluxed for about 3 hours. After completion of the reaction, the excess methyl iodide and the methyl alcohol were removed by distillation to obtain the compound of the formula (VII) which was again dissolved in 300 ml of methyl alcohol. To the resulting solution was added with stirring 50 ml of an aqueous solution of 3.4 g of sodium salt of tetraphenylboron to allow them to react to obtain 4.5 g of the objective 2-ethyl-1,4-dimethylimidazolium-tetraphenylborate (as white precipitate) having a melting point of 233°–236° C.

The amount to be used of the curing promoters mentioned above in detail has no particular limitation. It is sufficient to use 0.1 to 20 parts by weight of the promoter per 100 parts by weight of the epoxy resin. Particularly preferable is the range of from 0.5 to 10 parts by weight per 100 parts by weight of the epoxy resin. When the amount of promoter used is in said range, the resin composition is very high in storage stability, and also satisfactory in curability at practicable curing temperatures, and moreover, the cured product is excellent in various characteristics.

In this invention, the aforesaid curing agent (b) and curing promoter (c) may be used in combination with at least one of the following known curing agents: acid anhydride curing agents such as, for example, maleic anhydride, dichloromaleic anhydride, dodecenylsuccinic anhydride, pyromellitic dianhydride, trimellitic anhydride, phthalic anhydride, tetrahydrophthalic anhydride, methyltetrahydrophthalic anhydride, hexahydrophthalic anhydride, endomethylenetetrahydrophthalic anhydride, methylendomethylenetetrahydrophthalic anhydride, and hexachloroendomethylenetetrahydrophthalic anhydride; amine-type curing agents including aliphatic polyamines such as, for example, polymethylenediamine, polyetherdiamine, iminobispropylamine, bis(hexamethylene)-triamine, tetraethylenepentamine, and dimethylaminopropylamine; cycloaliphatic polyamines such as menthanediamine, N-aminoethylpiperazine, and 1,3-diaminocyclohexane; aliphatic amines containing an aromatic ring such as tetrachloro-p-xylenediamine; aromatic amines such as m-phenylenediamine, diaminodiphenyl ether, diaminodiphenylmethane, diaminodiphenylsulfone, benzidine, 4,4'-bis(o-toluidine), 4,4'-thiodianiline, dianisidine, methylenebis(o-chloroaniline), bis(3,4-diaminophenyl)-sulfone, and diaminoditolysulfone; and dicyandiamide; and initial condensation products for thermosetting resins such as polyamide resins, polysulfide resins, urea resins, and melamine resins.

The term "epoxy resins" used herein means a whole range of known epoxy resins including bisphenol-based epoxy resins formed from, for example, bisphenol-A and epichlorohydrin; novolac-based epoxy resins formed by reaction of novolac resins with epichlorohydrin; polyphenol-based epoxy resins formed by reacting epichlorohydrin with condensates of phenols and a xylene resin or toluene resin obtained by reaction between xylene and formaldehyde or toluene and paraformaldehyde, respectively; polyhydroxybenzene-based epoxy resins formed by reacting epichlorohydrin with phenolic resins obtained by using polyhydric phenols such as resorcinol and hydroquinone; epoxy resins obtained by reacting epichlorohydrin with aromatic or aliphatic carboxylic acids; epoxy resins formed from vinyl polymers; epoxy resins obtained from polyhydric alcohols such as glycerin; epoxy resins obtained from cycloaliphatic compounds such as cyclohexene, cyclopentadiene, and dicyclopentadiene; epoxy resins obtained from natural products such as starch and unsaturated higher fatty acids; nitrogen-containing epoxy resins obtained from aniline, aliphatic amines, and the like; epoxy resins having nitrogen-containing heterocyclic linkage obtained from isocyanuric acid; silicon-containing epoxy resins obtained by reacting silanols with epoxy resins; silicon-containing epoxy resins obtained by oxidation of silicon compounds having a carbon-to-carbon double bond; epoxidized phosphorous esters formed by epoxidizing phosphorous esters having an olefinic unsaturation with peracetic acid; and epoxy resins containing heavy metals other than silicon and phosphorus in the form of chelate. These epoxy resins may be used alone or in admixture of two or more.

The epoxy resin composition of this invention may be incorporated with powdered fillers such as, for example, glass, quartz glass, mica, calcium carbonate, calcium sulfate, barium sulfate, alumina, talc, clay, zirconium silicate (zircon), zirconium oxide, lithium aluminum silicate, beryl, aluminum silicate, beryllia, calcium silicate, and silica; flexibilizers such as, for example, polyethylene glycol, dimer acids, dodecenylsuccinic anhydride, polyamide resins, polysulfide resins, and urethane elastomers; releasing agents such as, for example, stearic acid, metal salts of stearic acid, silicone oils, silicone greases, fatty acids, fatty acid esters, and natural waxes; coupling agents such as, for example, γ-glycidoxypropyltrimethoxysilane, β-(3,4-epoxycyclohexyl)ethyltrimethoxysilane, vinyltrichlorosilane, n-(trimethoxysilylpropyl) ethylenediamine, and n-(dimethoxymethylsilylpropyl)ethylenediamine; and coloring agents such as, for example, carbon black, antimony oxide, Cadmium Red, Toluidine Red, Hansa Yellow, Phthalocyanine Blue, and Phthalocyanine Green. The amounts of these additives used may be determined in accordance with the amounts conventionally used for the respective purposes of use.

In incorporating the above-noted powdered inorganic fillers, a desirable result is obtained with respect to fluidity of the objective epoxy resin composition by combined use of fillers having different particle size distributions selected from two ranges, one of the ranges being 40 $\mu$ or less and the other from 70 to 300 $\mu$. A suitable mixing ratio is 3 to 0.3 part by volume of an inorganic filler having a particle size in the former range per part by volume of an inorganic filler having a particle size in the latter range. With such inorganic fillers, there is obtained an epoxy resin composition having a sufficient fluidity for practical uses even when the total amount of powdered inorganic fillers used reaches, at maximum, a large amount as high as 75 % by volume based on the total volume of the composition. By the addition of a large amount of inorganic fillers, it is also possible to reduce the thermal expansion coefficient of the cured product and to improve the mechanical properties, moisture resistance, and thermal resistance thereof. In order to reduce sufficiently the thermal expansion coefficient of a cured product, it is desirable to keep the lower limit of filler content of the resin composition at 40 % by volume (based on the total volume of the composition). Thus, it is possible to reduce the linear thermal expansion coefficient of the cured product to about $3.0 \times 10^{-5}/°C$ or lower.

The epoxy resin composition of this invention is useful, as mentioned above, as a material for molding adhesives, and coatings. Moreover, as a result of further investigations, the present inventors have succeeded in discovering a quite new effect of the present composition for molding various semiconductor devices. When a conventional epoxy resin composition is used in encapsulating a semiconductor device, the presence of a curing promoter contained in the composition results in a parasitic channel at the time of use of the device, whereby a leakage current is generated which markedly decreases the reliability of the device. Such a tendency becomes more pronounced in a device having a more sensitive surface such as field effect transistor (FET) device and in a device exposed to higher temperatures. To the coutrary, such a tendency is not significant in the present epoxy resin composition.

In encapsulating an FET device by use of the present epoxy resin composition, the above-mentioned parasitic channel generation can be effectively suppressed and the insulating resistance at high temperatures can be increased by incorporating in the composition an organic zinc compound as an additive. Examples of effective organic zinc compounds include zinc salicylate, zinc octoate, zinc stearate, zinc ethylenediaminetetraacetate, zinc acetate, zinc terephthalate, zinc lactate, zinc ethylphenyldithiocarbamate, zinc diethyldithiocarbamate, and 2-mercaptobenzothiazole zinc salt. The amount of organic compound to be incorporated is desirably 0.1 to 15 % especialy 0.5 to 7 % by volume based on the total volume of the epoxy resin composition, because if the incorporated amount is below 0.1 % by volume, the effect of addition becomes insignificant, while if the amount exceeds 10 % by volume, the cured material (encapsulating resin layer) becomes higher in linear thermal expansion coefficient ($\alpha$) and inferior in mechanical strengths, particularly in brittleness. By addition of a certain metal oxide, the parasitic channel effect can also be suppressed effectively and the insulating resistance of the cured material can be improved at higher temperatures. Examples of such useful metal oxides include lead oxides such as $PbO$, $PbO_2$, $Pb_2O_3$, and $Pb_3O_4$; titanium oxides such as $TiO_2$, $TiO_3$, and $Ti_2O_3$; and iron oxides such as $FeO$, $Fe_2O_3$, and $Fe_3O_4$. The amount of metal oxide to be incorporated is desirably 0.1 to 15 % by volume based on the total volume of the epoxy resin composition, because if the incorporated amount is below 0.1 % by volume, the effect of addition becomes insignificant, whilst if the amount exceeds 15 % by volume, the melt viscosity becomes so high that the moldability becomes inferior.

The invention is illustrated below in further detail referring to Examples, in which all parts are by weight.

| Example 1 | | Parts |
|---|---|---|
| (a) | Cresol-novolac-based epoxy resin (ECN 1299, CIBA Ltd.; epoxy equivalent, 235) | 100 |
| (b) | Phenol novolac resin (HP11N No.100, Hitachi Chemical Co., Japan; molecular weight, 700-1,000) | 50 |
| (c) | Tetraphenylphosphonium-tetraphenylborate | 3 |
| (d) | Powdered silica ($\leq 40 \mu$) | 153 |

| Example 2 | | Parts |
|---|---|---|
| (a) | Phenol-novolac-based epoxy resin (ERRO100, Union Carbide Corp.; epoxy equivalent, 225) | 100 |
| (b) | Phenol novolac resin (HP203N, Hitachi Chemical Co, Japan; molecular/weight, 800-1,200) | 60 |
| (c) | Triethylammonium-tetraphenylborate | 5 |
| (d) | Powdered silica ($\leq 40 \mu$) | 165 |

| Example 3 | | Parts |
|---|---|---|
| (a) | Bisphenol-A-based epoxy resin (E1001, Shell Chemical Co.; epoxy equivalent, 500) | 100 |
| (b) | Phenol novolac resin (HP11NNO. 100, Hitachi Chemical Co., Japan; molecular weight, 700N1,000) | 25 |
| (c) | Imidazolium-tetraphenylborate | 10 |

| Example 4 | | Parts |
|---|---|---|
| (a) | cycloaliphatic-type epoxy resin (CX313, Chisso Co.; epoxy equivalent, 400) | 100 |
| (b) | Phenol novolac resin (HP203N, Hitachi Chemical Co.; molecular weight, 700-800) | 30 |
| (c) | Tetramethylarsonium-tetraphenylborate | 2 |

| Example 5 | | Parts |
|---|---|---|
| (a) | Heterocyclic-type epoxy resin (TGIC, CIBA Ltd.; epoxy equivalent, 105) | 100 |
| (b) | Phenol novolac resin (HP203N, Hitachi Chemical Co., Japan; molecular weight, 500) | 100 |
| (c) | Triethylammonium-tetraphenylberate | 5 |

Comparative Example 1

| | | Parts |
|---|---|---|
| (a) | Cresol-novolac-based epoxy resin (ECN 1280, CIBA Ltd.; epoxy equivalent, 230 | 100 |
| (b) | Phenol novolac resin (HP11N No. 100, Hitachi Chemical Co., Japan; molecular weight, 700-1,000) | 50 |
| (c) | 2-Heptadecylimidazole | 3 |
| (d) | Powdered silica ( $\leq$ 40 $\mu$) | 153 |

Comparative Example 2

| | | Parts |
|---|---|---|
| (a) | Phenol-novolac-based epoxy resin (ERR 0100, Union Carbide Corp.; epoxy equivalent, 225) | 100 |
| (b) | Phenol-novolac resin (HP203N, Hitachi Chemical Co., Japan; molecular weight, 800-1,200) | 60 |
| (c) | 2-Undecylimidazole | 3 |
| (d) | Powdered silica ( $\leq$ 40 $\mu$) | 163 |

Comparative Example 3

| | | Parts |
|---|---|---|
| (a) | Bisphenol-A-based epoxy resin (E1001, Shell Chemical Co.; epoxy equivalent, 500) | 100 |
| (b) | Phenol novolac resin (HP11N No. 100, Hitachi Chemical Co., Japan; molecular weight, 700-1000) | 25 |
| (c) | 2-Ethyl-4-methylimidazole | 3 |

Comparative Example 4

| | | Parts |
|---|---|---|
| (A) | Cycloaliphatic type epoxy resin (CX313, Chisso co.; epoxy equivalent, 400) | 100 |
| (b) | Phenol novolac resin (HP203N, Hitachi Chemical Co., Japan; molecular weight, 600) | 30 |
| (c) | Benzalconium chloride | 5 |

The ingredients shown in each of Examples 1 to 5 and Comparative Examples 1 to 4 were mixed to form a uniform epoxy resin composition. Each composition was tested for curability and storage stability. The results obtained were as shown in Table 1.

Table 1

| Sample | | Curability *1 | Storage stability *2 |
|---|---|---|---|
| Example | 1 | 70 | 42 |
| do. | 2 | 75 | 40 |
| do. | 3 | 65 | 30 |
| do. | 4 | 80 | 33 |
| do. | 5 | 75 | 29 |
| Comparative Example | 1 | 70 | 7 |
| | 2 | 75 | 5 |
| Comparative Example | 3 | 80 | 3 |
| | | 80 | 3 |
| do. | 4 | 84 | 6 |

Note:
*1 Curability was shown in terms of gel time (in second) when the composition was kept at 150°c.
*2 Storage stability was shown in terms of time (in day) which had elapsed before the melt viscosity measured at 150°C reached a value as large as 10 times the initial value when the composition was kept at 40°C.

In Examples 1 and 2 and Comparative Examples 1 and 2, the composition was further incorporated with 50 % by weight of powdered silica as a filler and tested for storage stability. The results obtained were as shown in the accompanying figures. Curves 1 and 2 represent storage stabilities of the silica-filled samples obtained from the compositions of Examples 1 and 2, respectively. Curves 3 and 4 represent storage stabilities of the silica-filled samples obtained from the compositions of Comparative Examples 1 and 2, respectively.

Example 6

| | | Parts |
|---|---|---|
| (a) | Cresol-novolac-based epoxy resin (ECN1299, CIBA Ltd.; epoxy equivalent, 235) | 100 |
| (b) | Phenol novolac resin (curing agent) (HP11N No. 100, Hitachi Chemical Co., Japan; molecular weight, 700) | 50 |
| (c) | Triethylammonium-tetraphenylborate | 3 |
| (d) | Powdered quartz glass ( $\leq$ 40 $\mu$) | 160 (24 vol.-%) |
| | Powdered quartz glass (70-250 $\mu$; containing 50 % of the powder having A particle size of 150-250 $\mu$) | 200 (31 vol.-%) |
| (e) | Stearic acid | 2 |
| (f) | Carbon black | 1 |

Example 7

| | | Parts |
|---|---|---|
| (a) | Phenol-novolac-based epoxy resin (ERRO100, Union Carbide Corp.; epoxy equivalent, 230) | 100 |
| (b) | Phenol novolac resin (curing agent) (HP203N, Hitachi Chemical Co., Japan; molecular weight, 750) | 50 |
| (c) | Tetraphenylphosphonium-tetraphenylborate | 3 |
| (d) | Powdered alumina ( $\leq$ 40 $\mu$) | 225 (15 vol.%) |
| | Powdered alumina (70-200 $\mu$; containing 50% of the powder having a particle size of 150-250 $\mu$) | 750 (50 vol.-%) |
| (e) | Montan wax | 3 |
| (f) | Carbon black | 1 |

| Example 8 | | Parts |
|---|---|---|
| (a) | Bisphenol-A-based epoxy resin (E1001, Shell Chemical Co.; epoxy equivalent, 450) | 100 |
| (b) | Phenol novolac resin (curing agent) (HP11N No. 100, Hitachi Chemical Co., Japan; molecular weight, 800) | 50 |
| (c) | Tetraphenylarsonium-tetraphenylborate | 5 |
| (d) | Powdered zirconium silicate ($\leq 40\mu$) | 320 (20 vol.-%) |
| | Powdered zirconium silicate (70–250 $\mu$; containing 85% of the powder having a particle size of 60–200 $\mu$) | 620 (40 vol.-%) |
| (e) | Carnauba wax | 3 |
| (f) | Carbon black | 2 |

| Example 9 | | Parts |
|---|---|---|
| (A) | Cycloaliphatic-type epoxy resin (CX313, Chisso Co.; epoxy equivalent, 400) | 100 |
| (b) | Phenol novolac resin (curing agent) (HP203N, Hitachi Chemical Co., Japan; molecular weight, 600) | 85 |
| (c) | 2-Methylimidazolium-tetraphenylborate | 2 |
| (d) | Powdered quartz glass ($\leq 40 \mu$) | 290 (10 vol.-%) |
| | Powdered quartz glass (70–200 $\mu$; containing 90 % of the powder having a particle size of 100–200 $\mu$) | 790 (65 vol.-%) |
| (e) | Hoechst wax | 2 |
| (f) | Carbon black | 1 |
| (g) | $\gamma$-Glycidoxypropyltrimethoxysilane | 2 |

| Example 10 | | Parts |
|---|---|---|
| (a) | Heterocyclic-type epoxy resin (TGIC, CIBA Ltd.; epoxy equivalent, 105) | 100 |
| (b) | Phenol novolac resin (curing agent) (HP203N, Hitachi Chemical Co., Japan; molecular weight, 500) | 100 |
| (c) | 2-Methyl-4-ethylimidazolium-tetraphenylborate | 3 |
| (d) | Powdered zirconium silicate (70–250 $\mu$; containing 75% of the powder having a particle size of 100–250 $\mu$) | 1640 (50 vol.-%) |
| | Powdered zirconium silicate ($\leq 40 \mu$) | 810 (25 vol.-%) |
| (e) | Stearic acid | 2 |
| | Calcium stearate | 1 |
| (f) | Carbon black | 2 |

| Example 11 | | Parts |
|---|---|---|
| (a) | Brominated bisphenol-A-based epoxy resin (DER511, Dow Chemical Co.; epoxy equivalent, 350) | 100 |
| (b) | Phenol novolac resin (curing agent) (Hitachi Chemical Co., HP203N; molecular weight, 300) | 70 |
| (c) | Tetraphenylphosphonium-tetraphenylborate | 4 |
| (d) | Powdered quartz glass ($\leq 40 \mu$) | 160 (25 vol.-%) |
| | Powdered quartz galss (70–200 $\mu$; containing 80% of the powder having a particle size of 100–200 $\mu$) | 160 (25 vol.-%) |
| (e) | Hoechst wax | 3 |
| (f) | Carbon black | 0.5 |

| Comparative Example 5 | | Parts |
|---|---|---|
| (a) | Cresol-novolac-based epoxy resin (ECN 1299, CIBA Ltd.; epoxy equivalent, 235) | 100 |
| (b) | Phenol novolac resin (curing agent) (HP11N No. 100, Hitachi Chemical Co., Japan; molecular weight, 800) | 50 |
| (c) | 2-Heptadecylimidazole | 3 |
| (d) | Carbon black | 1 |
| | Powdered quartz glass ($\leq 40 \mu$) | 450 (60 vol.-%) |
| (e) | Stearic acid | 3 |

| Comparative Example 6 | | Parts |
|---|---|---|
| (a) | Phenol-novolac-based epoxy resin (ERRO100, Union Carbide Corp.; epoxy equivalent, 230 | 100 |
| (b) | Phenol novolac resin (curing agent) (HP203N, Hitachi Chemical Co., Japan; molecular weight, 600) | 60 |
| (d) | Powdered zirconium silicate ($\leq 40 \mu$) | 535 (45 vol.-%) |
| (e) | Stearic acid | 2 |
| | Calcium stearate | 1 |
| (f) | Carbon black | 3 |

| Comparative Example 7 | | Parts |
|---|---|---|
| (a) | Cresol-novolac-based eopxy resin (ECN1280, CIBA Ltd.; epoxy equivalent, 220) | 100 |
| (b) | Phenol novolac resin (curing agent) (HP11N No. 100, Hitachi Chemical Co., Japan; molecular weight, 800) | 60 |
| (c) | 2-Heptadecylimidazole | 2 |
| (d) | Powdered silica | 350 |
| (e) | Montan wax | 2 |
| (f) | Carbon black | 1 |

| Comparative Example 8 | | Parts |
|---|---|---|
| (a) | Phenol-novolac-based epoxy resin (ERRO100, Union Carbide Corp.; epoxy equivalent, 240) | 100 |
| (b) | Phenol novolac resin (curing agent) (HP223N, Hitachi Chemical Co., Japan; molecular weight, 550) | 40 |
| (c) | Boron trifluoride-aniline complex | 3 |
| (d) | Powdered silica | 300 |
| (e) | Carnauba wax | 3 |
| (f) | Carbon black | 1 |

| Comparative Example 9 | | Parts |
|---|---|---|
| (a) | Cresol-novolac-based epoxy resin (ECN1273, CIBA Ltd.; epoxy equivalent, 225) | 100 |
| (b) | Phenol novolac resin (curing agent) (HP203N, Hitachi Chemical Co., Japan; molecular weight, 450) | 45 |
| (c) | 2-Undecylimidazole | 3 |
| (d) | Powdered quartz glass | 300 |
| (e) | Hoechst wax | 2 |
| (f) | Carbon black | 1 |

The ingredients shown in each of Examples 6 to 11, and Comparative Examples 5 to 9 were blended with a mixing roll of 6-inch diameter heated at 70°–80°C for 5 to 10 minutes until the mixture became homogeneous to prepare an epoxy resin composition. The resulting compositions were tested for storage stability (change in melt viscosity), spiral flow characteristic as measured for fluidity (moldability), and linear thermal expansion coefficient ($\alpha$) of the cured samples. The results obtained were as shown in Table 2.

TABLE 2

| Sample | Storage stability° | Fluidity (spiral flow at 150°C.) (in.) | Linear thermal expansion coefficient ($\alpha \times 10^{-5}$/°C) |
|---|---|---|---|
| Example: | | | |
| 6 | 42 | 45 | 2.2 |
| 7 | 40 | 25 | 1.5 |
| 8 | 30 | 40 | 1.8 |
| 9 | 33 | 20 | 1.2 |
| 10 | 39 | 38 | 1.8 |
| 11 | 36 | 50 | 2.3 |
| Comparative Example: | | | |
| 5 | 7 | 5 | 2.0 |
| 6 | 5 | 35 | 2.8 |
| 7 | 6 | 30 | 3.0 |
| 8 | 3 | 20 | 2.8 |
| 9 | 7 | 40 | 3.8 |

Note:—
* Storage stability was shown in terms of time (in day) which had elapsed before the melt viscosity measured at 150°C reached a value as large as 10 times the initial value when the composition was kept at 40°C.

| Example 12 | | Parts |
|---|---|---|
| (a) | ECN1299 | 100 |
| (b) | HP203N | 50 |
| (c) | Triethylammonium-tetraphenylborate | 3 |
| (d) | Powdered quartz glass | 360 |
| (e) | Stearic acid | 2 |
| (f) | Carbon black | 1 |

| Example 13 | | Parts |
|---|---|---|
| (a) | ECN1280 | 100 |
| (b) | HP11N No. 100 | 60 |
| (c) | Tetraphenylphosphonium-tetraphenylborate | 4 |
| (d) | Powdered silica | 450 |
| (e) | Stearic acid | 2 |
| | Hoechst wax | 2 |
| (f) | Carbon black | 1 |
| (g) | γ-Glycidoxypropyltrimethoxysilane | 2 |
| (h) | 2-Mercaptobenzothiazole zinc salt | 5 |
| | | (1.6 vol.-%) |

| Example 14 | | Parts |
|---|---|---|
| (a) | ECN1273 | 100 |
| (b) | HP203N | 40 |
| (c) | 2-Ethylimidazolium-tetraphenylborate | 5 |
| (d) | Calcium carbonate | 450 |
| (e) | Stearic acid | 2 |
| (f | Carbon black | 1 |
| (h) | Lead tetroxide | 100 |
| | | (4 vol.-%) |

| Example 15 | | Parts |
|---|---|---|
| (a) | ERRO100 | 100 |
| (b) | HP11N No.100 | 100 |
| (c) | Triethylammonium-tetraphenylborate | 5 |
| (d) | Powdered quartz glass | 400 |
| (e) | Stearic acid | 2 |
| (f) | Carbon black | 1 |
| (b) | Titanium oxide | 75 |
| | | (6 vol.-%) |

| Example 16 | | Parts |
|---|---|---|
| (a) | ECN1273 | 100 |
| (b) | HP203N | 70 |
| (c) | Tetraphenylarsonium-tetraphenylborate | 5 |
| (d) | Zirconium silicate | 650 |
| (e) | Stearic acid | 2 |
| (f) | Carbon black | 1 |
| (g) | γ-Aminopropyltriethoxysilane | 2 |
| (h) | Ferriferrous oxide | 200 |
| | | (12 vol.-%) |

| Comparative Example 10 | | Parts |
|---|---|---|
| (a) | ECN1299 | 100 |
| (b) | HP203N | 40 |
| (c) | 2-Heptadecylimidazole | 3 |
| (d) | Powdered quartz glass | 250 |
| (e) | Stearic acid | 2 |
| (f) | Carbon black | 1 |

| Comparative Example 11 | | Parts |
|---|---|---|
| (a) | ECN1280 | 100 |
| (b) | HP11N No. 100 | 60 |
| (c) | Boron trifluoride-monoethylamine | 3 |
| (d) | Powdered silica | 400 |
| (e) | Stearic acid | 2 |
| (f) | Carbon black | 1 |

The ingredients shown in each of Examples 12 to 16 and Comparative Examples 10 and 11 were blended with a mixing roll of 8-inch diameter at 70° to 85°C for about 5 to 10 minutes until the mixture became homogeneous to prepare an epoxy resin composition.

Table 3

| Sample | Leakage current (μA) | | | | | | Insulating resistance of cured sample (Ω-cm) |
|---|---|---|---|---|---|---|---|
| | 20°C | 50°C | 80°C | 100°C | 120°C | 150°C | |
| Example | | | | | | | |
| 12 | 0 | 0 | 0.5 | 8 | 55 | 300 | $2 \times 10^{12}$ |
| 13 | 0 | 0 | 0 | 0 | 1 | 30 | $5.2 \times 10^{14}$ |
| 14 | 0 | 0 | 0 | 0 | 0.3 | 8 | $8.2 \times 10^{14}$ |
| 15 | 0 | 0 | 0 | 0 | 3 | 60 | $1.3 \times 10^{14}$ |
| 16 | 0 | 0 | 0 | 0 | 5 | 80 | $2.1 \times 10^{14}$ |
| Comparative Example | | | | | | | |
| 10 | 0 | 1.5 | 50 | 200 | 480 | 650 | $2.5 \times 10^{11}$ |
| 11 | 0 | 3.0 | 80 | 300 | 500 | 700 | $1.9 \times 10^{11}$ |

By using the resulting composition, the model MOS transistor having a sensitive surface was encapsulated by transfer molding at 165°C for 3 minutes, and post-cured at 180°C for 10 hours. The resin mold model device thus obtained was tested for the temperature characteristics of leakage current (MOS characteristics) in the following way. At a predetermined temperature, a negative voltage (−24V) was applied to a gate (G) for a predetermined period of time (1 to 2 hours), then a voltage (12V) was applied between a drainage (D) and a source (S), and immediately thereafter the gate (G) was opened, whereupon the electric charge (parasitic channel) which has been accumulated by voltage applied to the gate was discharged as a leakage current flowing between the drainage (D) and the source (S). The maximum leakage current was measured to evaluate the MOS characteristics. The results obtained were as shown in Table 3, in which the electrical insulating resistance of each of the cured compositions was also shown.

What is claimed is:

1. An epoxy resin composition consisting essentially of (a) 100 parts by weight of an epoxy resin having at least two vicinal epoxy groups per molecule, (b) 30 to 200 parts by weight of a curing agent consisting of a phenol novolac resin having at least two hydroxyl groups per molecule, and (c) 0.1 to 20 parts by weight of a curing promoter consisting of at least one organoboron compound selected from the group consisting of tetra-substituted phosphonium-tetra-substituted borates represented by the general formula (I):

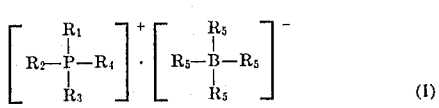

(I)

wherein $R_1$, $R_2$, $R_3$, and $R_4$ are independently alkyl groups, alkenyl groups, or aryl groups, and $R_5$ is a phenyl group or a substituted phenyl group; tetra-substituted arsonium-tetra-substituted borates represented by the general formula (II):

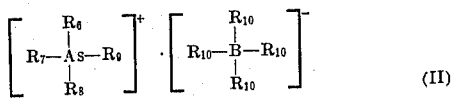

(II)

$R_6$, $R_7$, $R_8$, and $R_9$ are independently alkyl groups, alkenyl groups, or aryl groups and $R_{10}$ is a phenyl group or a substituted phenyl group; tetra-substituted ammonium-tetra-substituted borates represented by the general formula (III):

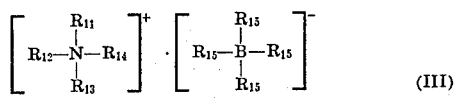

(III)

wherein $R_{11}$, $R_{12}$, $R_{13}$, and $R_{14}$ are independently hydrogen atoms, alkyl groups, hydroxyl groups, phenyl groups, or substituted phenyl groups, and $R_{15}$ is a phenyl group or a substituted phenyl group; and tetra-substituted borates of imidazole or tetra-substituted borates of imidazole derivatives formed by reacting alkali metal salts of tetra-substituted borons with imidazole salts or salts of imidazole derivatives obtained by reacting imidazole or imidazole derivatives represented by the general formula (IV):

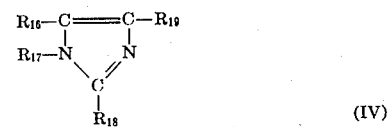

(IV)

wherein $R_{16}$, $R_{17}$, $R_{18}$, and $R_{19}$, which may be the same as or different from one another, are selected from the group consisting of hydrogen atom, alkyl groups, alkenyl groups, acyl groups, aryl groups, cycloalkyl groups, cycloalkenyl groups, aldehyde groups, carboxyl group, cyano group, and nitro group with acids.

2. An epoxy resin composition according to claim 1, wherein the amount of the curing agent (b) consisting of a phenol novolac resin is 40 to 100 parts by weight and the amount of the curing promoter (c) consisting of at least one salt compound is 0.5 to 10 parts by weight.

3. An epoxy resin composition according to claim 2, wherein the curing agent (b) consisting of a phenol novolac resin is selected from the group consisting of phenol novolac resin, o-cresol novolac resin, m-cresol novolac resin, and p-cresol novolac resin.

4. An epoxy resin composition according to claim 2, wherein the curing promoter (c) consisting of at least one organoboron compound is at least one member selected from the group consisting of tetra-butylphosphonium-tetra-phenylborate, n-butyltriphenylphosphonium-tetraphenylborate, tetraphenylphosponium-tetraphenylborate, trimethylphenylphosphonium-tetraphenylborate, diethylmethylphenylphosphonium-tetraphenylborate, diallylmethylphenyl-phosphonium-tetraphenylborate, (2-hydroxyethyl) ethyltriphenylphosphonium-tetraphenylborate, p-xylenebis-(triphenylphosphonium-tetraphenylborate), tetraphenylphosphoniumtetraethylborate, tetraphenylphosphonium-triethylphenylborate, tetraphenylphosphonium-tetrabutylborate, tetramethylarsonium-tetraphenylborate, tetraphenylarsonium-tetraphenylborate, dimethyldiethylarsonium-tetraphenylborate, triethyl-n-octylarsonium-tetraphenylborate, triethylammonium-tetraphenylborate, trimethylammonium-tetraphenylborate, triphenylammoniumtetraphenylborate, diethylmethylammonium-tetraphenylborate, diphenylmethylammonium-tetraphenylborate, imidazolium-tetraphenylborate, methylimidazolium-tetraphenylborate, 2-ethyl-4-methylimidazolium-tetraphenylborate, 2-ethyl-1,4-dimethylimidazolium-tetraphenylborate, 1-cyanoethyl-2-ethyl-4-methylimidazolium-tetraphenylborate, 1-cyanoethyl-2-undecylimidazolium-tetraphenylborate, 1-cyanoethyl-2-phenylimidazolium-tetraphenylborate, 1-vinyl-2-methylimidazolium-tetraphenylborate, 1-vinyl-2,4-dimethylimidazolium-tetraphenylborate, 1-β-hydroxyethyl-2-methylimidazolium-tetraphenylborate, 1-allyl-2-methylimidazolium-tetraphenylborate, 1-allyl-2-phenylimidazolium-tetraphenylborate, and 1-allyl-2-undecylimidazolium-tetraphenylborate.

5. An epoxy resin composition consisting essentially of (a) 100 parts by weight of an epoxy resin having at least two vicinal epoxy groups per molecule, (b) 30 to 200 parts by weight of a curing agent consisting of a phenol novolac resin having at least two hydroxyl groups per molecule, (c) 0.1 to 20 parts by weight of a curing promoter consisting of at least one organoboron compound selected from the group consisting of tetra-substituted phosphonium-tetra-substituted borates represented by the general formula (I):

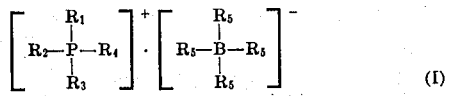

wherein $R_1$, $R_2$, $R_3$, and $R_4$ are independently alkyl groups, alkenyl groups, or aryl groups, and $R_5$ is a phenyl group or a substituted phenyl group, tetra-substituted arsonium-tetra-substituted borates represented by the general formula (II):

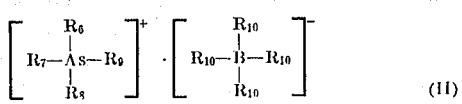

wherein $R_6$, $R_7$, $R_8$ and $R_9$ are independently alkyl groups, alkenyl groups, or aryl groups, and $R_{10}$ is a phenyl group or a substituted phenyl group, tetra-substituted ammonium-tetra-substituted borates represented by the general formula (III):

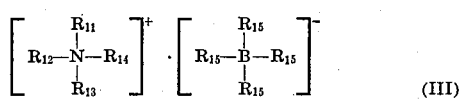

wherein $R_{11}$, $R_{12}$, $R_{13}$ and $R_{14}$ are independently hydrogen atoms, alkyl groups, hydroxyl groups, phenyl groups, or substituted phenyl groups, and $R_{15}$ is a phenyl group or a substituted phenyl group, and tetra-substituted borates of imidazole or tetra-substituted borates of imidazole derivatives formed by reacting alkali metal salts of tetra-substituted borons with imidazole salts or salts of imidazole derivatives by reacting imidazole or imidazole derivatives represented by the general formula (IV):

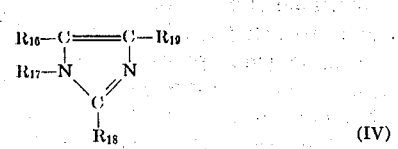

wherein $R_{16}$, $R_{17}$, $R_{18}$, and $R_{19}$, which may be the same as or different from one another, are selected from the group consisting of hydrogen atom, alkyl groups, alkenyl groups, acyl groups, aryl groups, cycloalkyl groups, cycloalkenyl groups, aldehyde group, carboxyl group, cyano group, and nitro group with acids, and (d) 0.1 to 15 % by volume (based on the total volume of the composition) of at least one additive selected from the group consisting of lead oxides, titanium oxides, iron oxides, and organic zinc compounds.

6. An epoxy resin composition accoding to claim 5, wherein the amount of the additive (d) is 0.5 – 7 % by volume based on the total volume of the composition.

7. An epoxy resin composition consisting essentially of (a) 100 parts by weight of an epoxy resin having at least two vicinal epoxy groups per molecule, (b) 30 to 200 parts by weight of a curing agent consisting of a phenol nocolac resin having at least two hydroxyl groups per molecule, (c) 0.1 to 20 parts be weight of a curing promoter consisting of at least one organoboron compound selected from the group consisting of tetra-substituted phosphonium-tetra-substituted borates represented by the general formula (I):

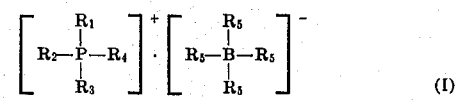

wherein $R_1$, $R_2$, $R_3$, and $R_4$ are independently alkyl groups, alkenyl groups or aryl groups, and $R_5$ is a phenyl group or a substituted phenyl group, tetra-substituted arsonium-tetra-substituted borates represented by the general formula (II):

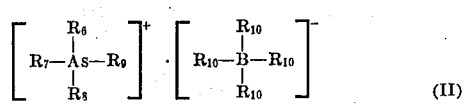

wherein $R_6$, $R_7$, $R_8$, and $R_9$ are independently alkyl groups, alkenyl groups, or aryl groups, and $R_{10}$ is a phenyl group or a substituted phenyl group, tetra-substituted ammonium-tetra-substituted borates represented by the general formula (III):

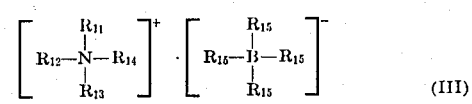

wherein $R_{11}$, $R_{12}$, $R_{13}$, and $R_{14}$ are independently hydrogen atoms, alkyl groups, hydroxyl groups, phenyl groups, or substituted phenyl groups, and $R_{15}$ is a phenyl group or a substituted phenyl group, and tetrasubstituted borates of imidazole or tetra-substituted borates of imidazole derivatives formed by reacting alkali metal salts of tetra-substituted borons with imidazole salts or salts of imidazole derivatives obtained by reacting imidazole or imidazole derivatives represented by the general formula (IV):

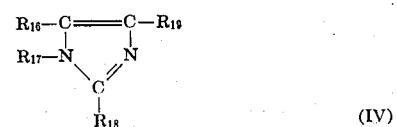

wherein $R_{16}$, $R_{17}$, $R_{18}$, and $R_{19}$, which may be the same as or different from one another, are selected from the group consisting of hydrogen atom, alkyl groups, alkenyl groups, acyl groups, aryl groups, cycloalkyl groups, cycloalkenyl groups, aldehyde group, carboxyl group, cyano group, and nitro group with acids, and (e) 40 to 75 % by volume (based on the total volume of the composition) of a powered inorganic filler having such a particle size distribution that the volume ratio of the particles having a diameter of 70 to 300 $\mu$ to the particles having a diameter of 40 $\mu$ or smaller is 1:3 to 0.3.

8. An epoxy resin composition consisting essentially of (a) 100 parts by weight of an epoxy resin having at least two vicinal epoxy groups per molecule, (b) 30 to 200 parts by weight of a curing agent consisting of a phenol novolac resin having at least two hydroxyl groups per molecule, (c) 0.1 to 20 parts by weight of a curing promotre consisting of at least one organoboron compound selected from the group consisting of tetra-substituted phosphonium-tetra-substituted borates represented by the general formula (I):

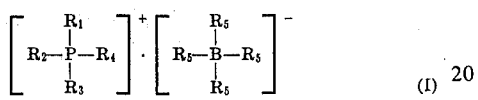
(I)

wherein $R_1$, $R_2$, $R_3$, and $R_4$ are independently alkyl groups, alkenyl groups, or aryl groups, and $R_5$ is a phenyl group or a substituted phenyl group, tetra-substituted arsonium-tetra-substituted borates represented by the general formula (II):

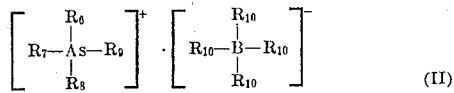
(II)

wherein $R_6$, $R_7$, $R_8$, and $R_9$ are independently alkyl groups, alkenyl groups, or aryl groups, and $R_{10}$ is a phenyl group or a substituted phenyl group, tetra-substituted ammonium-tetra-substituted borates represented by the general formula (III):

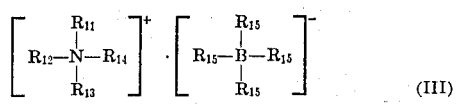
(III)

wherein $R_{11}$, $R_{12}$, $R_{13}$, and $R_{14}$ are independently hydrogen atoms, alkyl groups, hydroxyl groups, phenyl groups, or substituted phenyl groups, and $R_{15}$ is a phenyl group or a substituted phenyl group, and tetra-substituted borates of imidazole or tetra-substituted borates of imidazole derivatives formed by reacting alkali metal salts of tetra-substituted borons with imidazole salts or salts of imidazole derivatives obtained by reacting imidazole or imidazole derivatives represented by the general formula (IV):

$$\begin{array}{c} R_{16}-C=\!=\!=C-R_{19} \\ | \quad\quad\quad\quad | \\ R_{17}-N \quad\quad N \\ \diagdown\!\!\diagup \\ C \\ | \\ R_{18} \end{array} \quad (IV)$$

wherein $R_{16}$, $R_{17}$, $R_{18}$, and $R_{19}$, which may be the same as or different from one another, are selected from the group consisting of hydrogen atom, alkyl groups, alkenyl groups, acyl groups, aryl groups, cycloclkyl groups, cycloalkenyl groups, aldehyde group, carboxyl group, cyano group, and nitro group with acids, and (d) 0.1 to 15 % by volume (based on the total volume of the composition) of at least one additive selected from the group consistinng of lead oxides, titanium oxides, iron oxides, and organic zinc compounds, and (e) 40 to 75% by volume (based on the total volume of the composition) of a powdered inorganic filler having such a particle size distribution that the volume ratio of the particles having a diameter of 70 to 300 $\mu$ to the particles having a diameter of 40 $\mu$ or smaller is 1:3 to 0.3.

* * * * *